(12) United States Patent
Patterson et al.

(10) Patent No.: US 9,043,271 B2
(45) Date of Patent: May 26, 2015

(54) SYSTEM AND METHOD FOR MANAGING A PLURALITY OF SNAPSHOTS

(75) Inventors: Hugo Patterson, Mountain View, CA (US); Harald I. Skardal, Nashua, NH (US); Stephen L. Manley, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 583 days.

(21) Appl. No.: 12/348,634

(22) Filed: Jan. 5, 2009

(65) Prior Publication Data

US 2009/0177718 A1 Jul. 9, 2009

Related U.S. Application Data

(63) Continuation of application No. 10/101,901, filed on Mar. 19, 2002, now Pat. No. 7,475,098.

(51) Int. Cl.
| | |
|---|---|
| *G06F 17/30* | (2006.01) |
| *G06F 11/14* | (2006.01) |
| *G06F 11/20* | (2006.01) |

(52) U.S. Cl.
CPC ........ *G06F 11/1469* (2013.01); *G06F 11/2064* (2013.01); *G06F 11/1471* (2013.01); *G06F 17/30* (2013.01); *G06F 11/1458* (2013.01); *G06F 2201/84* (2013.01); *G06F 11/1456* (2013.01); *G06F 11/1461* (2013.01); *G06F 11/1464* (2013.01); *Y10S 707/99953* (2013.01); *Y10S 707/99955* (2013.01)

(58) Field of Classification Search
CPC ... H04L 25/493; G06F 17/30; G06F 11/1471; G06F 11/2064; G06F 2201/84

USPC .......... 707/608–642, 644, 646; 711/162, 302, 711/136
See application file for complete search history.

(56) References Cited

U.S. PATENT DOCUMENTS

| | | | |
|---|---|---|---|
| 4,570,217 A | 2/1986 | Allen et al. | |
| 4,627,019 A | 12/1986 | Ng | |
| 4,733,353 A * | 3/1988 | Jaswa ........................... 713/375 | |
| 5,124,987 A | 6/1992 | Milligan et al. | |
| 5,155,835 A | 10/1992 | Belsan | |
| 5,163,131 A | 11/1992 | Row et al. | |

(Continued)

FOREIGN PATENT DOCUMENTS

| | | |
|---|---|---|
| EP | 0369707 A2 | 5/1990 |
| EP | 1003103 A2 | 5/2000 |

(Continued)

OTHER PUBLICATIONS

Campbell, Richard Managing AFS Andrew File System, Prentice Hall PTR, Upper Saddle River, NJ, 1998, 497 pages.

(Continued)

*Primary Examiner* — Tony Mahmoudi
*Assistant Examiner* — Merilyn Nguyen
(74) *Attorney, Agent, or Firm* — Cesari and McKenna, LLP

(57) ABSTRACT

A method and apparatus for backing up a computer system. A backup is provided of a data stored on a first computer by the first computer generating a dump stream. The dump stream is transmitted to a second computer, the second computer uses the dump stream to maintain a file system copy of the data. One or more snapshots of the file system of the second computer are stored on a backup computer, the snapshots providing a backup of the data stored on the first computer.

16 Claims, 14 Drawing Sheets

(56) References Cited

U.S. PATENT DOCUMENTS

| | | | |
|---|---|---|---|
| 5,193,184 | A | 3/1993 | Belsan et al. |
| 5,202,979 | A | 4/1993 | Hillis et al. |
| 5,210,866 | A | 5/1993 | Milligan et al. |
| 5,212,789 | A | 5/1993 | Rago |
| 5,239,359 | A | 8/1993 | Rudeseal et al. |
| 5,247,647 | A | 9/1993 | Brown et al. |
| 5,278,979 | A | 1/1994 | Foster et al. |
| 5,287,496 | A | 2/1994 | Chen et al. |
| 5,355,453 | A | 10/1994 | Row et al. |
| 5,379,391 | A | 1/1995 | Belsan et al. |
| 5,485,579 | A | 1/1996 | Hitz et al. |
| 5,790,773 | A | 8/1998 | DeKoning et al. |
| 5,802,366 | A | 9/1998 | Row et al. |
| 5,819,292 | A | 10/1998 | Hitz et al. |
| 5,835,953 | A | 11/1998 | Ohran |
| 5,931,918 | A | 8/1999 | Row et al. |
| 5,941,972 | A | 8/1999 | Hoese et al. |
| 5,963,962 | A * | 10/1999 | Hitz et al. ............... 1/1 |
| 6,065,037 | A | 5/2000 | Hitz et al. |
| 6,067,550 | A * | 5/2000 | Lomet ................... 1/1 |
| 6,078,932 | A | 6/2000 | Haye et al. |
| 6,327,251 | B1 * | 12/2001 | Bion ............................. 370/255 |
| 6,425,035 | B2 | 7/2002 | Hoese et al. |
| 6,559,089 | B1 | 5/2003 | Razavi et al. |
| 6,625,704 | B2 | 9/2003 | Winokur |
| 6,665,815 | B1 | 12/2003 | Goldstein et al. |
| 6,708,227 | B1 | 3/2004 | Cabrera et al. |
| 6,732,293 | B1 * | 5/2004 | Schneider ........................ 714/15 |
| 6,748,504 | B2 * | 6/2004 | Sawdon et al. ............... 711/162 |
| 6,799,258 | B1 | 9/2004 | Linde |
| 6,915,397 | B2 * | 7/2005 | Lubbers et al. ............... 711/162 |
| 6,941,490 | B2 | 9/2005 | Ohran |
| 6,948,038 | B2 | 9/2005 | Berkowitz et al. |
| 6,959,310 | B2 * | 10/2005 | Eshel et al. ........................... 1/1 |
| 6,973,549 | B1 * | 12/2005 | Testardi ........................ 711/150 |
| 7,010,553 | B2 | 3/2006 | Chen et al. |
| 7,043,503 | B2 | 5/2006 | Haskin et al. |
| 7,072,915 | B2 | 7/2006 | Kaczmarski et al. |
| 7,216,135 | B2 | 5/2007 | Sawdon et al. |
| 7,225,204 | B2 | 5/2007 | Manley et al. |
| 7,467,167 | B2 | 12/2008 | Patterson |
| 2002/0016827 | A1 | 2/2002 | McCabe et al. |
| 2002/0049883 | A1 * | 4/2002 | Schneider et al. ............ 711/100 |
| 2002/0064149 | A1 * | 5/2002 | Elliott et al. ................... 370/352 |
| 2002/0133320 | A1 * | 9/2002 | Wegerich et al. .................. 703/2 |
| 2002/0166117 | A1 * | 11/2002 | Abrams et al. ................ 717/177 |
| 2002/0178146 | A1 | 11/2002 | Akella et al. |
| 2003/0110266 | A1 * | 6/2003 | Rollins et al. ................. 709/227 |
| 2003/0126247 | A1 | 7/2003 | Strasser et al. |
| 2003/0163493 | A1 | 8/2003 | Burns et al. |
| 2004/0010487 | A1 | 1/2004 | Prahlad et al. |

FOREIGN PATENT DOCUMENTS

| | | |
|---|---|---|
| WO | WO 91-08536 A1 | 6/1991 |
| WO | WO 91-08537 A1 | 6/1991 |
| WO | WO 00-07104 A | 2/2000 |
| WO | WO 01-31446 A | 5/2001 |

OTHER PUBLICATIONS

Borg, Anita et al. "Fault Tolerance Under UNIX" ACM Transactions in Computer Systems, vol. 7, No. 1, Feb. 1989, p. 1-24.

Patterson, David A. et al. "Introduction to Redundant Arrays of Inexpensive Disks (RAID)" CompCon 89. 34$^{th}$ IEEE Computer Society International Conference, Feb. 27-Mar. 3, 1989, pp. 112-117.

Akyurek, Sedat, Placing Replicated Data to Reduce Seek Delays, Department of Computer Science, University of Maryland, UMIACS-TR-91-121, CS-TR-2746, Aug. 1991.

Bitton, Dina, Disk Shadowing, Proceedings of the 14th VLDB Conference, LA, CA 1988.

Chaudhuri, Surajit, et al., Self-Tuning Technology in Microsoft SQL Server, Data Engineering Journal 22, 2 1999, pp. 20-27.

Chutani, Sailesh, et al., The Episode File System, In Proceedings of the USENIX Winter 1992.

Coyne, Robert A., et al., Storage Systems for National Information Assets, Proc. Supercomputing 92, Minneapolis, Nov. 1992, pp. 626-633.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Howard, John, H. et al., Scale and Performance in a Distributed File System, Carnegie Mellon University, CMU-ITC-87-068, Aug. 1987.

Howard, John H., An Overview of the Andrew File System, Carnegie Mellon University, CMU-ITC-88-062 1988.

Howard, John, H. et al., Scale and Performance in a Distributed File System, ACM Trans. Computer System, 6(1), Feb. 1988 pp. 51-81.

Kazar, Michael Leon, Synchronization and Caching Issues in the Andrew File System, Carnegie Mellon University, CMU-ITC-88-063.

Kazar, Michael L., et al., DEcorum File System Architectural Overview, USENIX Summer Conference, Anaheim, California, 1990.

Kemper, Alfons, et al., Performance Tuning for SAP R/3, Data Engineering Journal 22, 2 1999 pp. 33-40.

Kent, Jack et al., Optimizing Shadow Recovery Algorithms, IEEE Transactions on Software Engineering, 14( 2): 155-168 , Feb. 1988.

Kistler, et al., Disconnected Operation in the Coda File System, ACM Transactions on Computer Systems, vol. 10, No. 1, Feb. 1992, pp. 3-25.

Lorie, Raymond, A. Physical Integrity in a Large Segmented Database, ACM Trans. Database Syst., vol. 2, Mar. 1977, pp. 91-104.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.

Patterson, D., et al., A Case for Redundant Arrays of Inexpensive Disks (RAID), Technical Report, CSD-87-391, Computer Science Division, Electrical Engineering and Computer Sciences, University of California at Berkeley 1987.

Patterson, D., et al., A Case for Redundant Arrays of Inexpensive Disks (RAID), SIGMOD Internatonal Conference on Management of Data, Chicago, IL, USA, Jun. 1-3, 1988, SIGMOD Record (17)3:109-16 Sep. 1988.

Peterson, Zachary Nathaniel Joseph, Data Placement for Copy-on-Write Using Virtual Contiguity, University of CA, Santa Cruz, Master's Thesis for the Department of Science in Computer Science, Sep. 2002.

Quinlan, Sean, A Cached WORM File System, Software-Practice and Experience, 21(12):1289-1299 1991.

Rosenblum, Mendel, et al., The LFS Storage Manager, Computer Science Division, Electrical Engineering and Computer Science, Univ. of CA, presented at Summer '90 USENIX Technical Conference, Anaheim, CA Jun. 1990.

Rosenblum, Mendel, et al. The Design and Implementation of a Log-Structured File System Jul. 24, 1991 pp. 1-15.

Rosenblum, Mendel, The Design and Implementation of a Log-Structured File System, 1992 pp. 1-93.

Rosenblum, Mendel, et al., The Design and Implementation of a Log-Structured File System, In Proceedings of ACM Transactions on Computer Systems, (10)1:26-52, Feb. 1992.

Schiefer, Berni , et al., DB2 Universal Database Performance Tuning, Data Engineering Journal 22, 2 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, 2 1999 pp. 41-47.

Sidebotham, Bob, Volumes: The Andrew File System Data Structuring Primitive, EEUG Conference Proceedings, Manchester, UK, Autumn 1986.

(56) References Cited

OTHER PUBLICATIONS

Subramanian, Muralidhar, et al., Performance Challenges in Object-Relational DBMSs, Data Engineering Journal 22, 2 1999 pp. 28-32.
Weikum, Gerhard, et al., Towards Self-Tuning Memory Management for Data Servers, Data Engineering Journal 22, 2 1999 pp. 3-11.
West, Michael, et al. The ITC Distributed File System: Prototype and Experience, Carnegie-Mellon University, Technical Report CMU-ITC-040, Mar. 1985.
Zayas, Edward R., AFS-3 Programmer's Reference: Architectural Overview, Transarc Corporation, Pittsburgh, PA, 1.0 edition 1991.
Ellis, Susan, et al., "Getting Started With XFS Filesystems," Silicon Graphics, Inc., 1994, Total 29 Pages.
Lutz, Dave, "Epoch-1 Infinite Storage Server: A Magical Solution to Unix Storage Woes (Reviewed, Revealed, Revised)," Network Computing, n 207, 20, 1991, Total 9 Pages.
Kolstad, Rob, "Backing up Large Systems," UNIX Review vol. 9, No. 5, May 1991, Total 6 Pages.
"Storage Management Mechanism for Managing Snapshot Pages" IBM Technical Disclosure Bulletin, IBM Corp. New York, US, vol. 35, No. 4B, Sep. 1, 1992, pp. 26-29.
European Search Report, Munich, Leuridan, K., Jan. 4, 2005.
Partial European Search Report, Munich, Leuridan, K., Jan. 4, 2005.
Hitz, David, et al., TR3002 File System Design for an NFS File Server Appliance, Network Appliance, Inc., Mar. 1995.
Common Internet File System (CIFS) Version: CIFS-Spec 0.9, Storage Networking Industry Association (SNIA), Draft CIFS Documentation Work Group Work-in-Progress, Revision Date: Mar. 26, 2001.

\* cited by examiner

SYSTEM AND METHOD FOR MANAGING A PLURALITY OF SNAPSHOTS

RELATED APPLICATIONS

This application is a continuation of U.S. patent application Ser. No. 10/101,901, filed Mar. 19, 2002, now issued as U.S. Pat. No. 7,475,098 on Jan. 6, 2009.

This application is related to the following United States patent application:

Ser. No. 10/101,889, filed Mar. 19, 2002, now U.S. Pat. No. 7,467,167, issued Dec. 16, 2008 and entitled SYSTEM AND METHOD FOR COALESCING A PLURALITY OF SNAPSHOTS by Hugo Patterson, which is incorporated herein by reference.

FIELD OF THE INVENTION

The present invention relates to data protection and restoral and, in particular to managing multiple backups of data.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that implements file system semantics and manages data access. In this sense, Data ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

In a file server environment, data protection is typically implemented by generating a backup of selected volumes and/or files systems. These backups are generally stored on a tape drive. In certain known file server configurations, a full backup of the entire file system or volumes is initially created. This full backup stores all of the data contained in the selected volume or file system. At set intervals thereafter, incremental backups are generated. These incremental backups record the changes or deltas, between the full backup or last incremental backup and the current state of the data. These backups, both full and incremental, are typically written to a tape drive. A noted disadvantage of writing backups to tape devices is the relatively at which they commit backup data to storage. Overall server performance may be substantially degraded during the backup operation due to the large processing overhead involved with a tape backup operation. This processing overhead derives from copying operations involving the large amount of data that is being moved from the disks comprising the file system or volume to the backup tape device.

When restoring a file system from a tape backup, many incremental backups are utilized to fully restore the file system. Each of the deltas, or incremental backups, must be individually restored, in the proper order, to generate the active file system. Thus, to fully restore a file system from a set of tape backups, the full backup must first be restored. Then each of the incremental backups, are restored in the proper order to the file system.

Given the slow speed and other above-noted disadvantages to a tape backup system it seems clear that many administrators would prefer a tapeless backup alternate. One commercially available tapeless backup is the CommVault® Galaxy™ Storage Management Software produced by CommVault Systems of Oceanport, N.J. The CommVault system utilizes magneto-optic or compact disc drives in a jukebox setting. This known implementation permits random access of the data so that single file restoration is possible. However, a notable disadvantage to such jukebox systems is that they require a large number of optical disks to contain the entire body of the full and incremental backups. These optical disks need to be stored, handled and changed and are, thus subject to loss or damage.

SUMMARY OF THE INVENTION

The disadvantages of the prior art are overcome by providing a system and method for managing a plurality of snapshots. To facilitate management, a metadata file is created in the active file system to be snapshotted that stores data concerning the state of the file system. This state information can then be utilized by various application programs to determine how a particular snapshot should be managed. Including this metadata within a snapshot of a file system makes the snapshot become self-describing by including various state information of the snapshotted file system. The resulting system enables a fast and low-overhead tapeless backup at a remote destination backup server.

The destination backup server, utilizing a file system capable of producing snapshots, is adapted so that backup clients of the backup server can perform conventional backup and recovery or replication operations to replicate backup client file systems on the backup server. At predetermined times, the backup server's file system is snapshotted. A process within the storage operating system of the backup server then manages these collected snapshots according to a user-defined schedule. This management of the plurality of snapshots can include such activities as deletion of stored snapshots based upon a variety of parameters including, e.g., the timestamp stored in the metadata of a snapshot.

A backup client can selectively restore a path to a desired file without fully restoring an entire file system. This restoring on demand is accomplished by restoring the root directory of a snapshotted file system and then only restoring directories in the path to a particular file. The inodes of the partially restored directories are marked to alert the file system of a backup client to access the backup server for additional files and/or directories.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 1:
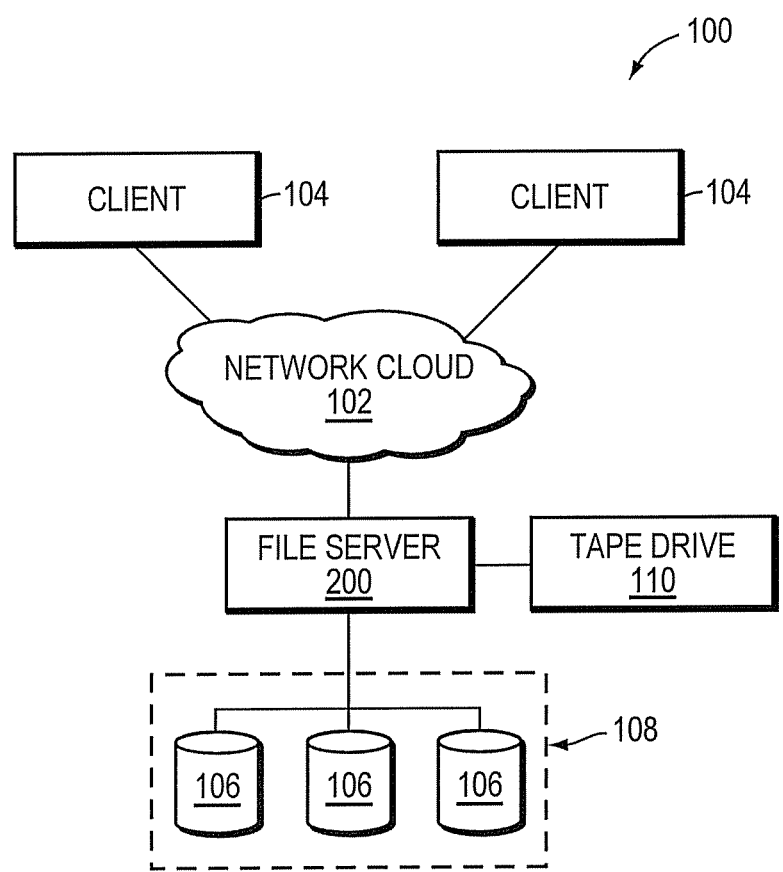
FIG. 1 is a schematic block diagram of an exemplary network environment having file servers and tape drives.

FIG. 1 is a schematic block diagram of an exemplary network environment 100 in which the principles of the present invention are implemented. A network 100 is based around a network cloud 102. This network cloud can be a local or network (LAN), a wide area network (WAN), virtual private network (VPN) utilizing communication links over the internet, for example, or a combination of LAN, WAN and VPN implementations can be established. For the purposes of this description, the term network cloud should taken broadly to include any acceptable network architecture. The network cloud 102 interconnects various clients 104. Also attached to the network cloud is a file server 200. This file server, described further below is configured to control storage of, and access to, data and a set 108 of interconnected storage volumes 106. Connected to the file server is a tape drive 110. In known data backup examples, the file server 200 would back up data stored on disks 106 to the tape drive 110. Each of the devices attached to the network cloud include an appropriate conventional network interface arrangement (not shown) for communicating over the network cloud using desired communication protocols such as the well-known Transport Control Protocol/Internet Protocol (TCP/IP), User Datagram Protocol (UDP), Hyper Text Transport Protocol (HTTP), Simple Network Management Protocol (SNMP), or Virtual Interface Connections (VI).

B. File Servers

Figure 2:
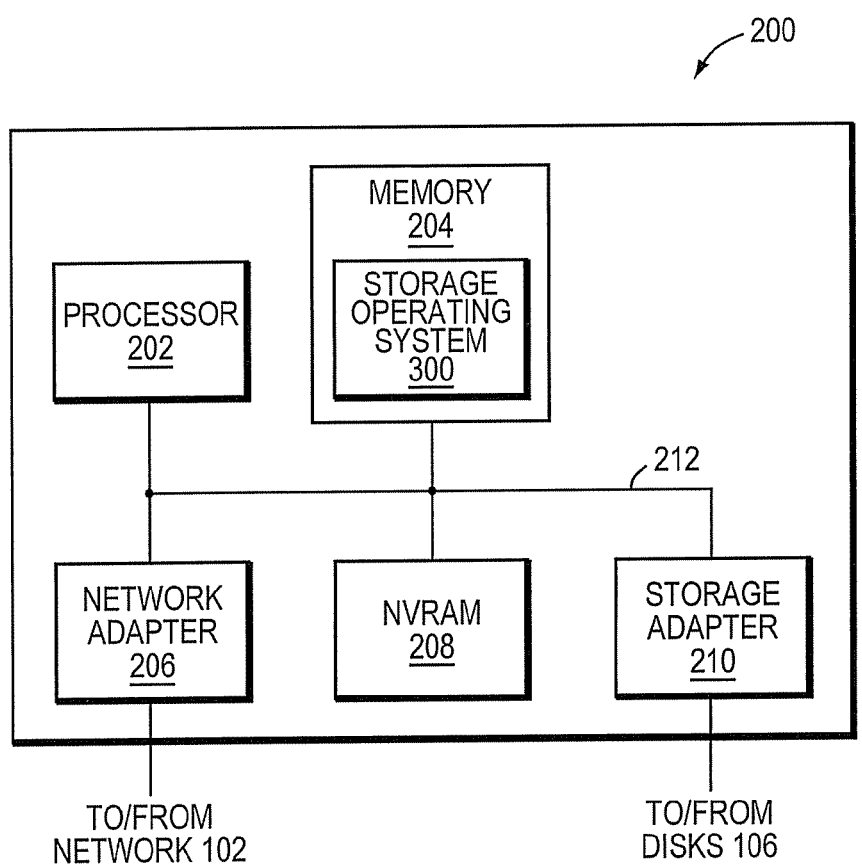
FIG. 2 is a schematic block diagram of an exemplary file server in accordance with an embodiment of this invention.

FIG. 2 is a more-detailed schematic block diagram of an exemplary file server 200. By way of background, a file server or filer, is a computer that provides file service relating to the organization of information on storage devices, such as disks. However, it will be understood by those skilled in the art that the inventive concepts described here may apply to any type of file server, wherever implemented as a special-purpose or general-purpose computer, including a standalone computer.

The file server 200 comprises a processor 202, in memory 204, in network adapter 206, a nonvolatile random access memory (NVRAM) 208 in the storage adapter 210 interconnected by system bus 212. Contained within the memory 204 is a storage operating system 300 that implements a file system to logically organize the information as a hierarchical structure of directories and files on the disks. In the illustrative embodiment, the memory 204 comprises storage locations that are addressable by the processor and adapters for storing software program code. The operating system 300, portions of which are typically resident in memory and executed by the processing elements, functionally organizes the filer by inter alia, invoking storage operations in support of a file service implemented by the file server.

The network adapter 206 comprises a mechanical, electrical and signaling circuitry needed to connect the file server 200 to client 104 over network cloud 102. The client 104 maybe a general-purpose computer configured to execute applications, such as data base applications. Moreover, the client 104 may interact with the filer server 200 in accordance with the client/server model of information delivery. That is, the client may request the services of the file server, and the file server may return the results of the services requested by the client, by exchanging packets defined by an appropriate networking protocol.

The storage adapter 210 incorporates with the storage operating system 300 executing on the file server to access information requested by the client. Information maybe stored on the disks 106 of a disk 108 (FIG. 1) that is attached via the storage adapter 210 to the file server. The storage adapter 210 includes input/output (I/O) interface circuitry that couples to the disks over in I/O interconnect arrangement, such as a conventional high-performance Fibre Channel serial link topology. The information is retrieved by the storage adapter and, if necessary, processed by the processor 202 (or the adapter 210 itself) prior to be forwarded over the system bus 212 to the network adapter 206, where information is formatted into appropriate packets and returned to the client 104.

In one exemplary file server implementation, the file server can include a nonvolatile random access memory (NVRAM) 208 that provides fault-tolerant backup of data, enabling the integrity of filer server transactions to survive a service interruption based upon a power failure, or other fault.

C. Storage Operating System

To facilitate the generalized access to the disks 106 on the array 108, the storage operating system 300 implements write-anywhere file system that logically organizes the information as a hierarchical structure of directories and files on the disks. Each "on-disk" file may be implemented as a set of disks blocks configured to distort information, such as data, where as the directory may be implemented as a specially formatted file which other files and directories are stored. As noted above, in the illustrative embodiment described herein, the operating system is the NetApp® Data ONTAP™ operating system available from Network Appliance, Inc., that implements the write-anywhere file layout (WAFL™) file system. It is expressly contemplated that any appropriate file system can be used, and as such, where the term WAFL or file system is employed, it should be taken broadly to refer to any file system that is otherwise adaptable to the teachings of this invention.

The storage operating system comprises a series of software layers, including a media access layer 302 of network drivers (e.g., an Ethernet driver). The storage operating system 300 further includes network protocol layers, such as an Internet Protocol (IP) layer 304 and its supporting transport mechanisms, the Transport Control Protocol (TCP) layer 306 and the User Datagram Protocol (UDP) layer 308.

A file system protocol layer provides multi-protocol data access and, to that end, includes support for the Network File System (NFS) protocol 312, the Common Internet File System (CIFS) protocol 314 and the Hyper Text Transfer Protocol (HTTP) 316. In addition, the storage operating system 300 includes a disk storage layer 322 that implements a disk storage protocol, such as a RAID protocol, and a disk driver layer 324 that implements a disk access protocol such as, e.g., a Small Computer System Interface (SCSI) protocol.

Bridging the disk software layers with the network and file system protocol layers is a file system layer 326 of the storage operating system 300. Generally the file system layer 326 implements a file system having an on-disk format representation that is block-based using, e.g., 4-kilobyte (KB) data blocks and using inodes to describe the files. In response to transaction requests, the file system generates operations to load (retrieve) the requested data from disks 106 if it is not resident "in-core", i.e., in the filer's memory 204. If the information is not in memory, the file system layer 326 indexes into the inode file using the inode number to access an appropriate entry and retrieve a logical volume block number. The file system layer 326 then passes the logical volume block number to the disk storage (RAID) layer 322, which maps that logical number to a disk block number and sends the latter to an appropriate driver (for example, an encapsulation of SCSI implemented on a fibre channel disk interconnection) of the disk driver layer 324. The disk driver accesses the disk block number from disks 106 and loads the requested data in memory 204 for processing by the filer 200. Upon completion of the request, the filer (and storage operating system) returns a reply, e.g., a conventional acknowledgement packet defined by the CIFS specification, to the client 104 over the network cloud 102.

It should be noted that the storage access request data path 330 through storage operating system layers described above needed to perform data storage access for the client requests received the file server may alternately be implemented in hardware, software or a combination of hardware and software. That is, in an alternative embodiment of this invention, the storage access request data path 330 may be implemented as logic circuitry embodied within a field programmable gate array (FPGA) or in an application specific integrated circuit (ASIC). This type of hardware implementation increases the performance of the file service provided by the file server 200 in response to a file system request issued by a client.

Included within the file system layer is a set of snapshot processes 328, which implement the inherent snapshot capabilities of the file system. The native Snapshot™ capabilities of the WAFL file system are further described in *TR3002 File System Design for an NFS File Server Appliance* by David Hitz et al., published by Network Appliance, Inc., and in U.S. Pat. No. 5,819,292 METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference. "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

Figure 4:
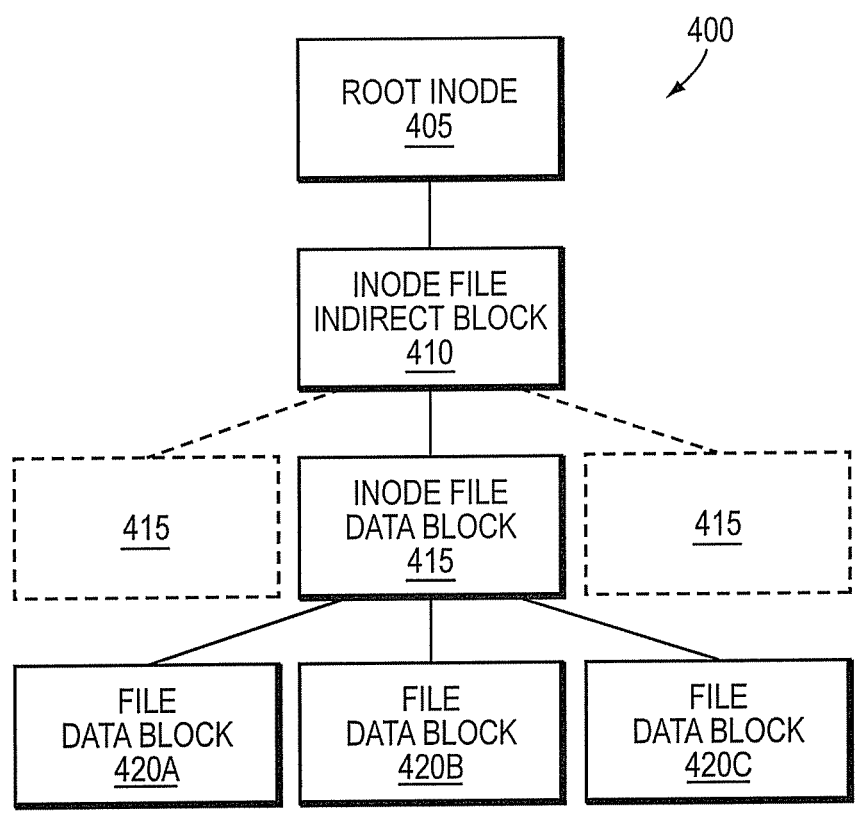
FIG. 4 is schematic block diagram of an exemplary file system inode structure.

By way of background, a snapshot is a restorable version of a file system created at a predetermined point in time. Snapshots are generally created on some regular schedule. The snapshot is stored on-disk along with the active file system, and is called into the buffer cache of the filer memory as requested by the storage operating system. An exemplary file system inode structure 400 is shown in FIG. 4. The root inode 405 contains information describing the inode file associated with a given file system. In this exemplary file system inode structure root inode 405 contains a pointer to the inode file indirect block 410. The inode file indirect block 410 contains a set of pointers to inode file and data blocks 415. The inode file data block 415 includes pointers to file and data blocks to 420A, 420B and 420C. Each of the file data blocks 420(A-C) is capable of storing, in the illustrative embodiment, 4 kilobytes (KB) of data.

Figure 5:
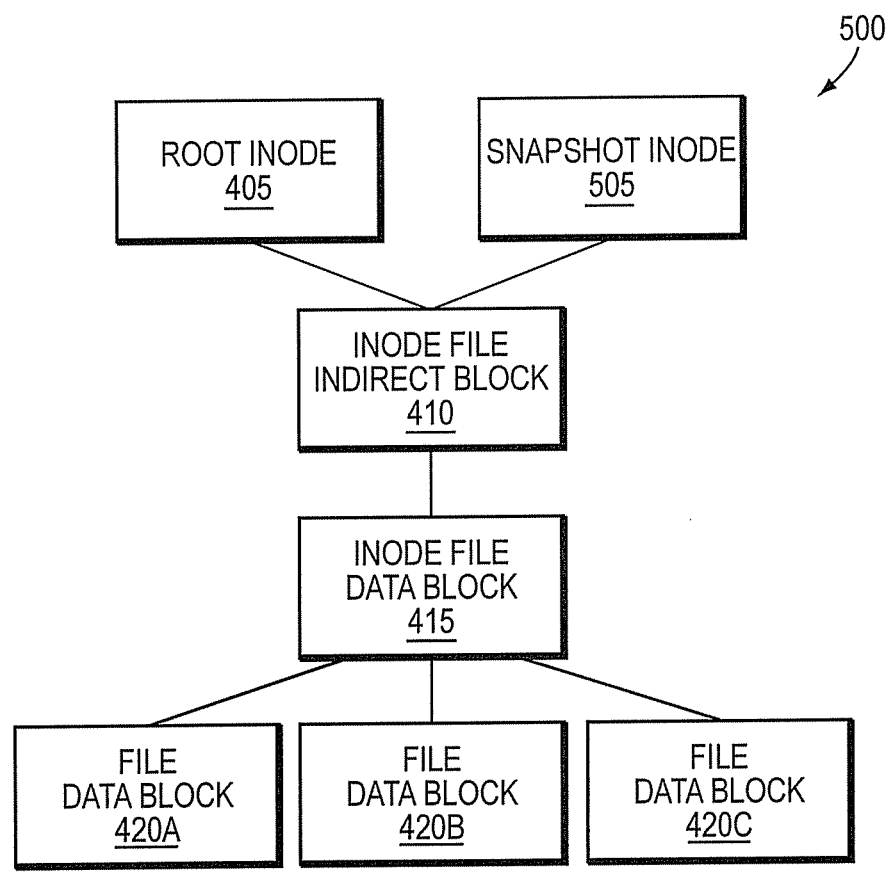
FIG. 5 is a schematic block diagram of the exemplary file system inode structure of FIG. 4 including a snapshot inode.

When the file system generates a snapshot of a given file system, a snapshot inode is generated as shown in FIG. 5. The snapshot inode 505 is, in essence, a duplicate copy of the root inode 405 of the file system 400. Thus, the exemplary file system structure 500 includes the same inode file indirect block 410, inode file data block(s) 415 and file data blocks 420A-C as in FIG. 4. When a user modifies a file data block, the file system layer writes the new data block to disk and changes the active file system to point to the newly created block.

Figure 6:
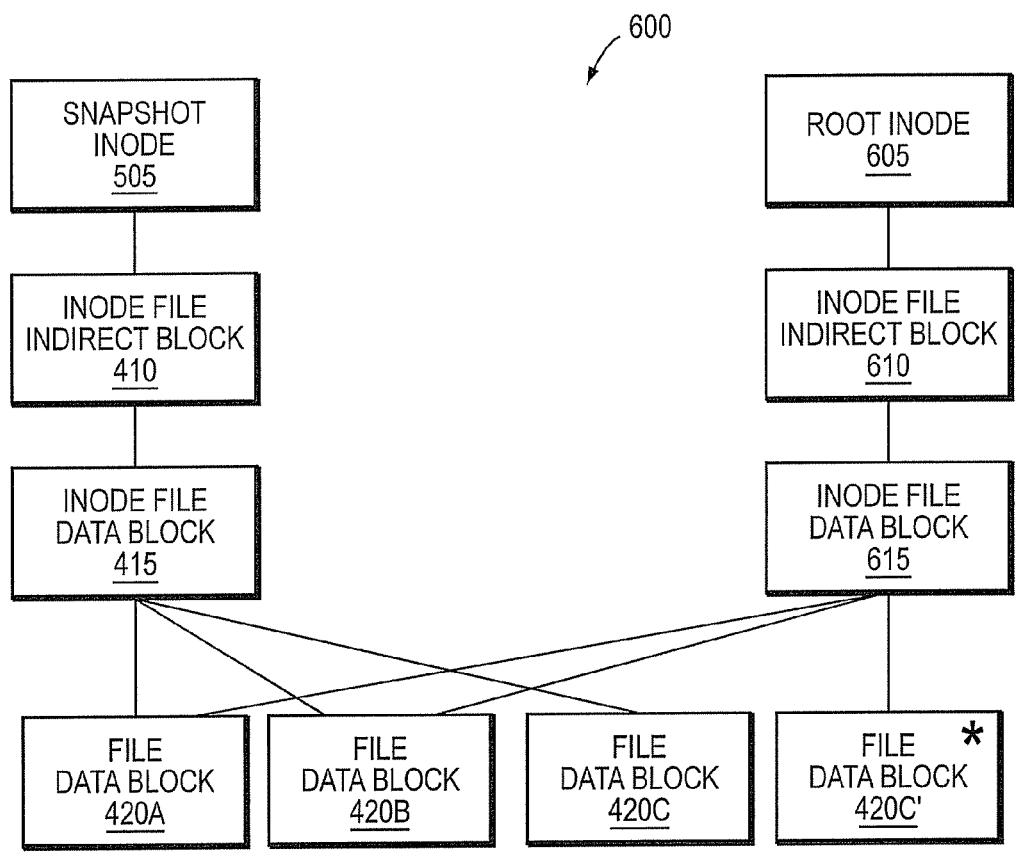
FIG. 6 is a schematic block diagram of an exemplary file system inode structure of FIG. 4 after data block has been rewritten.

FIG. 6 shows an exemplary inode file system structure 600 after a file data block has been modified. In this illustrative example, file data block 420C was modified to file data block 420C'. When file data block 420C is modified file data block 420C', the contents of the modified file data block are written to a new location on disk as a function for the exemplary WAFL file system. Because of this new location, the inode file data block 615 pointing to the revised file data block 420C must be modified to reflect the new location of the file data block 420C. Similarly, the inode file indirect block 610 must be rewritten to point to the newly revised inode file and data block. Thus, after a file data block has been modified the snapshot inode 505 contains a point to the original inode file system indirect block 410 which in turn contains a link to the inode file data block 415. This inode file data block 415 contains pointers to the original file data blocks 420A, 420B and 420C. However, the newly written inode file data block 615 includes pointers to unmodified file data blocks 420A and 420B. The inode file data block 615 also contains a pointer to the modified file data block 420C' representing the new arrangement of the active file system. A new file system root inode 605 is established representing the new structure 600. Note that metadata (not shown) stored in any snapshotted blocks (e.g., 505, 410, and 420C) protects these blocks from being recycled or overwritten until they are released from all snapshots. Thus, while the active file system root inode 605 points to new blocks 610, 615 and 420C', the old blocks 505, 410, 415 and 420C are retained until the snapshot is fully released.

After a snapshot has been created and file data blocks modified, the file system layer can reconstruct or "restore" the file system inode structure as it existed at the time of the snapshot by accessing the snapshot inode. By following the pointers contained in the snapshot inode 505 through the inode file indirect block 410 and inode file data block 415 to the unmodified file data blocks 420A-C, the file system layer can reconstruct the file system as it existed at the time of creation of the snapshot.

In alternate embodiments of a storage operating system, the snapshot management layer 332 permits users to define a set schedule of operations to be performed on a plurality of snapshots. The user defines the set schedule by inputting via a command line interface (CLI) or a graphical user interface (GUI) specific operations and parameters to be performed on the snapshots created by the snapshot process 328. Typically, backup servers, described further below, would execute a storage operating system including a snapshot management layer. However, it is expressly contemplated that alternate implementations of file servers or computers could execute a storage operating system including the functionality of a snapshot management layer.

D. Snapshot Contents

Figure 7:
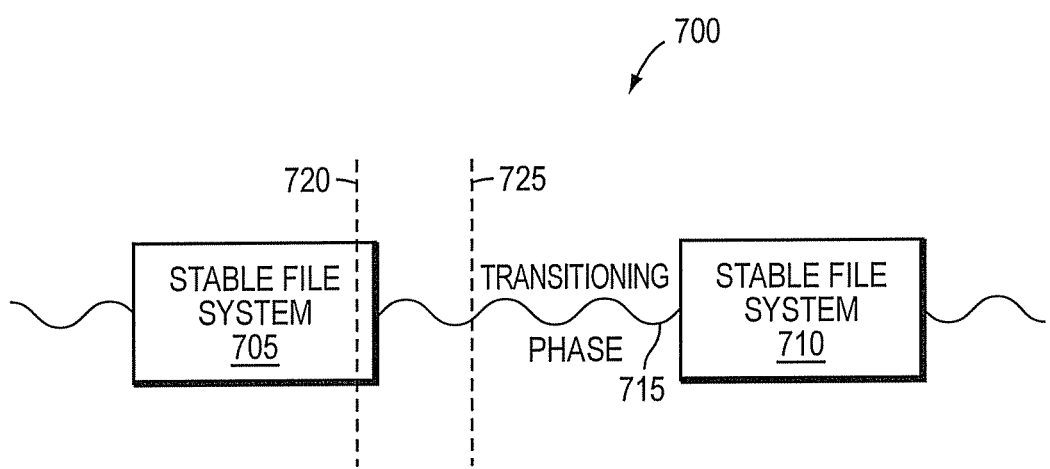
FIG. 7 is a time line of a stable and transitioning file system.

As snapshots of a file system can be generated at any time, problems can occur if a snapshot is taken of a file system while it is being updated. An exemplary timeline 700 of the states that a file system undergoes is shown in FIG. 7. The file system is initially stable during time 705. By "stable" it is meant that no updates are being physically written to the disks or inode structures comprising the file system. The file system then enters a transitioning phase 715 before reaching another instance of a stable file system 710. During the transitioning phase 715, data is written to the file system or the file system is otherwise modified, e.g., files are deleted. Thus, while the file system is transmitting, particular inodes and data blocks are modified. As noted above, snapshots of a file system can be generated at any time. Thus, for example, a snapshot, could be generated at time 720 (stable period) or 725 (transitioning period). A snapshot generated at time 720, would capture a stable file system with no updates occurring.

As numerous snapshots are generated at arbitrary periods, some will capture stable file systems and others will capture file systems in transition. For restoration purposes, it is desired to know the status of the file system contained within a particular snapshot. A database could be created and maintained to track each snapshot of a file system and its associated status (i.e., stable or transitioning). However, such a database would require additional computational overhead.

Figure 8:
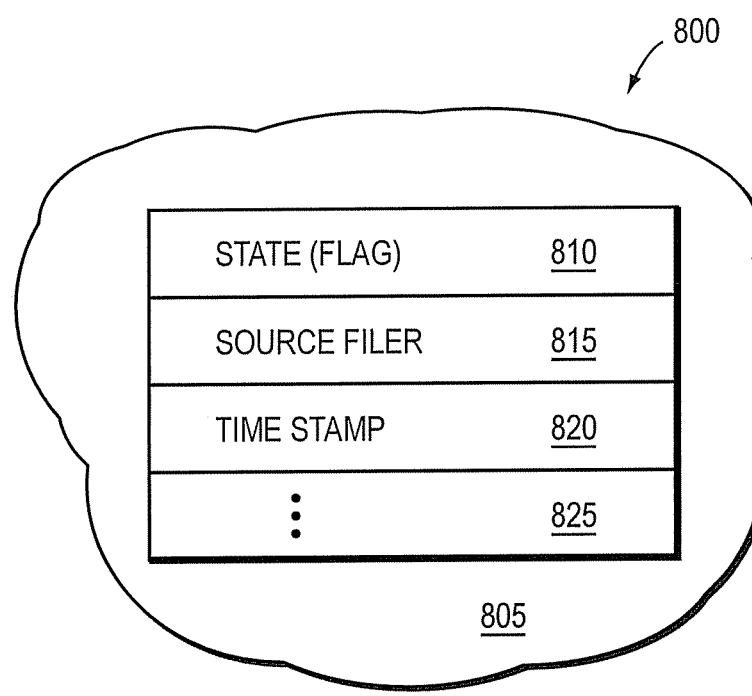
FIG. 8 is a schematic block diagram of snapshot metadata in accordance with an embodiment of this invention.

To enable a user or administrator to determine if a particular snapshot is of a stable or transitioning file system, the state of the file system is stored in the active file system. By "active file system" it is meant generally the file system associated with a particular computer to which current input/output operations are being directed. This metadata, or data associated with the state of the file system, can be stored in a variety of places in the active file system. In one embodiment, a file is created in the active file system to store the metadata. The contents of the metadata stored in the active file system is shown in FIG. 8. Stored within the active file system 800, is a set of metadata 805. This metadata 805 includes various entries, including entries for the state 810, the source filer 815, a time stamp 820 and, in alternate embodiments, additional entries 825. The state entry 810 can be implemented as a binary flag. If, for example, the value of the state flag is "1", the file system is stable. Alternately, if the value of the state flag is "0", the file system is in a transitioning state. Thus, the file system can modify the state entry to show that the file system is transitioning before the file system begins to modify data within the file system. Thus, any snapshots taken during the course of the data update, will include the metadata showing that the file system is in a transitioning state. Once the data update is complete, a file system modifies the state entry 810 to show that the file system is stable. In one embodiment, this metadata is stored in a qtree metafile. Qtree metafiles are described further in U.S. Pat. No. 7,010,553, issued on Mar. 7, 2006 and entitled SYSTEM AND METHOD FOR REDIRECTING ACCESS TO A REMOTE MIRRORED SNAPSHOT AND STORAGE OF SNAPSHOT METADATA IN REMOTE FILE, by Stephen L. Manley et al.

The source filer entry 815 is used to identify the file server originating a particular file system. Such a flag can be useful when, for example, a plurality of snapshots from differing file servers are stored on a single volume. The coalescing of snapshots is described in related U.S. Pat. No. 7,467,167, issued Dec. 16, 2008 and entitled SYSTEM AND METHOD FOR COALESING A PLURALITY OF SNAPSHOTS by Hugo Patterson, which is incorporated herein by reference.

Figure 9:
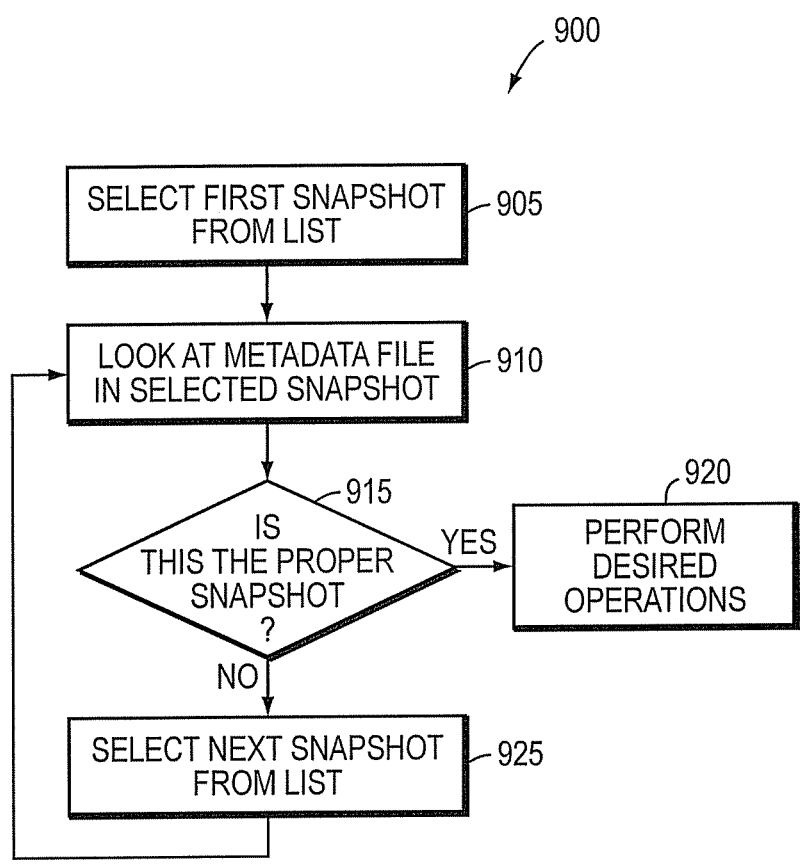
FIG. 9 is a flow chart detailing the procedure performed in utilizing stored metadata to select a proper snapshot.

By utilizing the time stamp entry 820 in the metadata 805, a file server can determine if a particular snapshot contains the desired version of the file system. If, for example, a user desired to restore a file or files from a particular time frame, the user or the administrator would need to know the particular time a snapshot was created. FIG. 9 is a flow chart detailing procedure performed by a user in determining if a particular snapshot is a proper snapshot for a desired operation (e.g., restoring a file from a certain point-in-time). In step 905, the user selects the first snapshot from a list of available snapshots. This list of snapshots is maintained by the file system. Next, in step 910, the process would look at the metadata file in the selected snapshot. By sorting or analyzing the data contained within the metadata a determination can be made if this snapshot is the proper snapshot (step 915). If the snapshot is the proper snapshot, the desired operation is performed on/with the selected snapshot (step 920). If the snapshot is not the proper snapshot, then the process selects the next snapshot from a list of available snapshots (step 925). After selecting the next snapshot from the list, the process branches to step 910 to query the metadata contained within the selected snapshot.

Thus, by storing metadata relating to a snapshot in the active file system, a snapshot of that file system naturally and invariably includes the metadata. In effect, the snapshot becomes self-describing based upon the incorporated metadata. This facilitates management of a plurality of snapshots. Additionally, other process and programs can utilize the metadata stored in the snapshot to make management decisions with regard to the particular snapshot.

E. Snapshot Management

Figure 3:
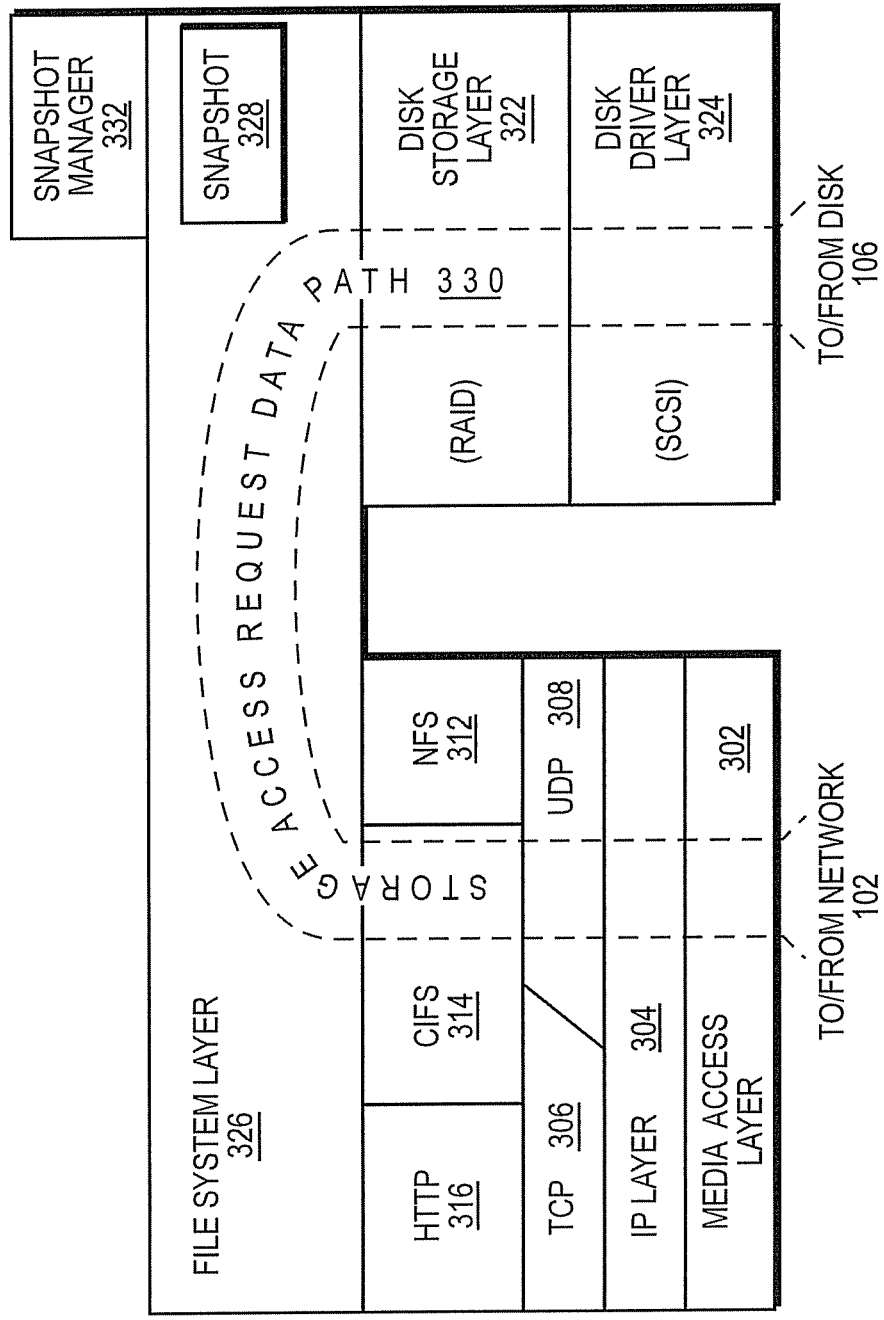
FIG. 3 is schematic block diagram of an exemplary storage file system for use in accordance with an embodiment of this invention.

In accordance with an embodiment of the present invention, to manage a set of backups or snapshots of a series of backup clients, a separate backup server is utilized. Such a backup server can be implemented as, e.g., a filer server executing a storage operating system having a snapshot management layer 332 (FIG. 3). Likewise, any or all of the backup clients can be implemented in accordance with the above description.

As a backup client of the backup server generates various backups of the backup client's file systems, these backups are restored to a file system associated with the backup server. Thus, at any given time, the backup server contains a complete file system of an associated backup client. By "backup client" it is meant any other device or computer that utilizes the capabilities of the back up server for storage and management of snapshots. The backed up data of the backup client is not stored as a base line backup along with a series of incremental backups. Instead, the entire file system is replicated on the backup server.

The snapshot management software 332 can be used to maintain the set of backups generated. An example of such management is deleting certain snapshots over time. It is generally desirable for the backup server to delete snapshots after a certain time period. It is infeasible to store every snapshot generated, as it would require an ever-increasing amount of storage space. The user can define a schedule of storing and maintaining the snapshots stored on the backup server. Thus, the backup client can generate a backup or snapshot at regular intervals. The snapshots are then transferred to the backup server at a predetermined time interval. The backup client is then free to subsequently delete these various snapshots to free disk space on the backup client. However, the backup server manages the set of snapshots in accordance with the user-defined schedule.

A notable feature of the use of a backup server is that the system administrator is not limited by the tape infrastructure. The backup server can be located at a significantly greater distance (e.g., any distance served by a network) than is possible with a small computer system interface (SCSI) buss commonly attached tape drive. Another advantage of the use of a backup server is that a backup client can use known dump and restore backup software and/or procedures. Such dump and restore backup procedures, in connection with a backup server able to implement snapshots, permits snapshots to be effectively generated of file systems managed by computers which utilize a file system that does not contain inherent snapshot capabilities.

Figure 10:
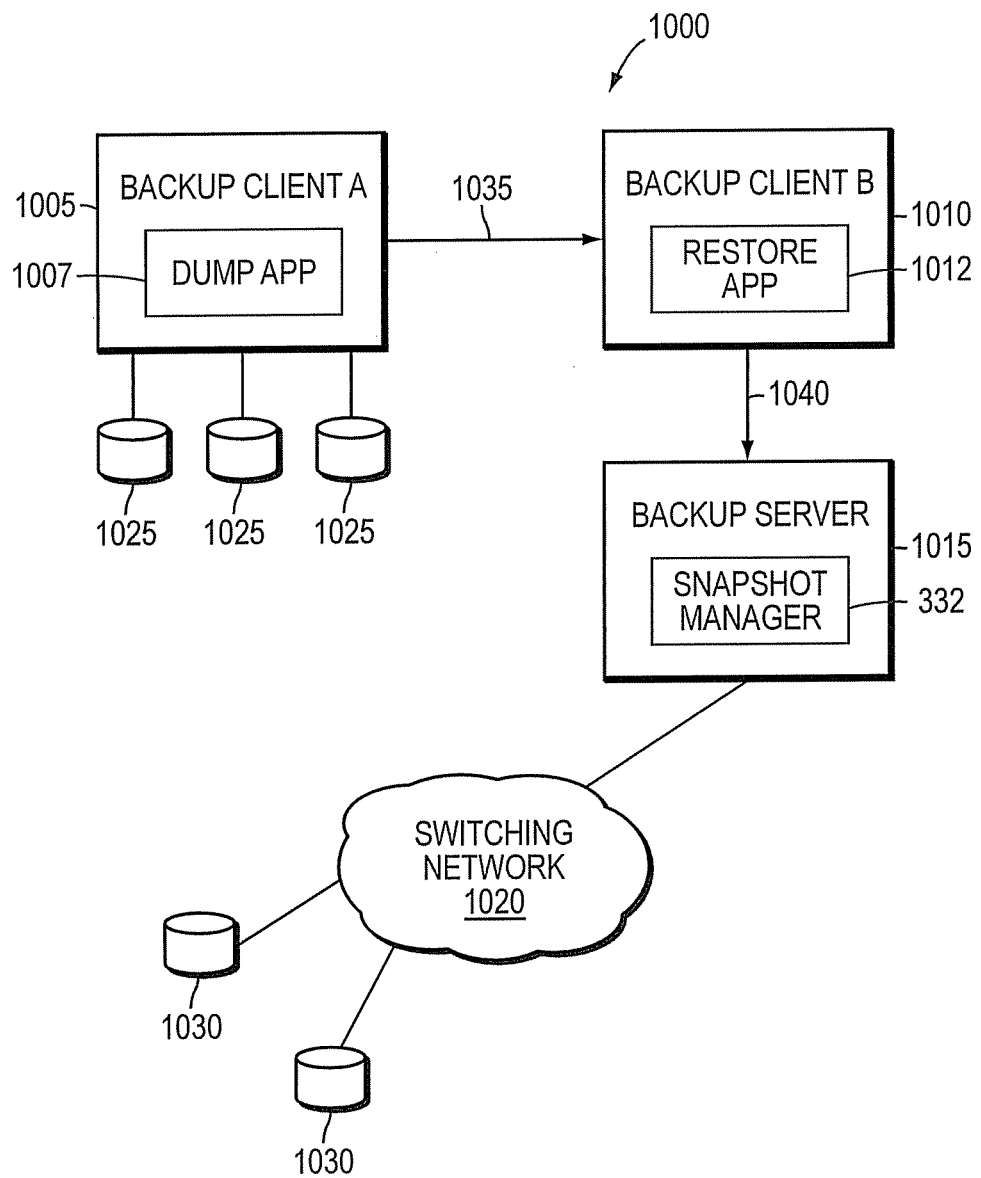
FIG. 10 is a schematic block diagram of an exemplary networking environment including file servers in accordance with an embodiment of this invention.

An example of such a backup network arrangement is shown in FIG. 10. The network environment 1000 includes backup client A 1005, backup client B 1010, and the backup server 1015. Connected to the backup server 1015 is a switching network 1020. A plurality or set of disks 1030 is connected to the switching network. The backup server utilizes these disks to store its file system. Connected to backup client A 1005 is a set of locally connected disks 1025. If backup client A 1005 is running a conventional backup software (Dump App) 1007 which permits a dump stream to be generated, similar to a conventional backup operation, over data path 1035 to server B. Data path 1035 can be any form of data path, including a local area network (LAN), a wide area network (WAN), or other acceptable networking architecture. Backup client B 1010 accepts the dump stream generated from backup client A 1005 and utilizing conventional restore software (Restore App) 1012 performs a restore operation to the backup server over data path 1040 via a restore stream. A restore stream comprises a series of write operations directed at the backup server's file system. The stream can be encapsulated in a variety of network protocols including TCP/IP.

The data path 1040, similarly to data path 1035 can be of any acceptable networking architecture. The backup client B 1010 generates the restore stream, which recreates a file system on a volume associated with the backup server. The backup server 1015 can then generate a series of snapshots of the data stored on the volume. As the file system contained on the backup servers disks 1030 is a restored version of the file system stored on backup client A's disks 1025, the backup server, by generating snapshots, is effectively generating snapshots of the file system contained on disks 1025.

Figure 11:
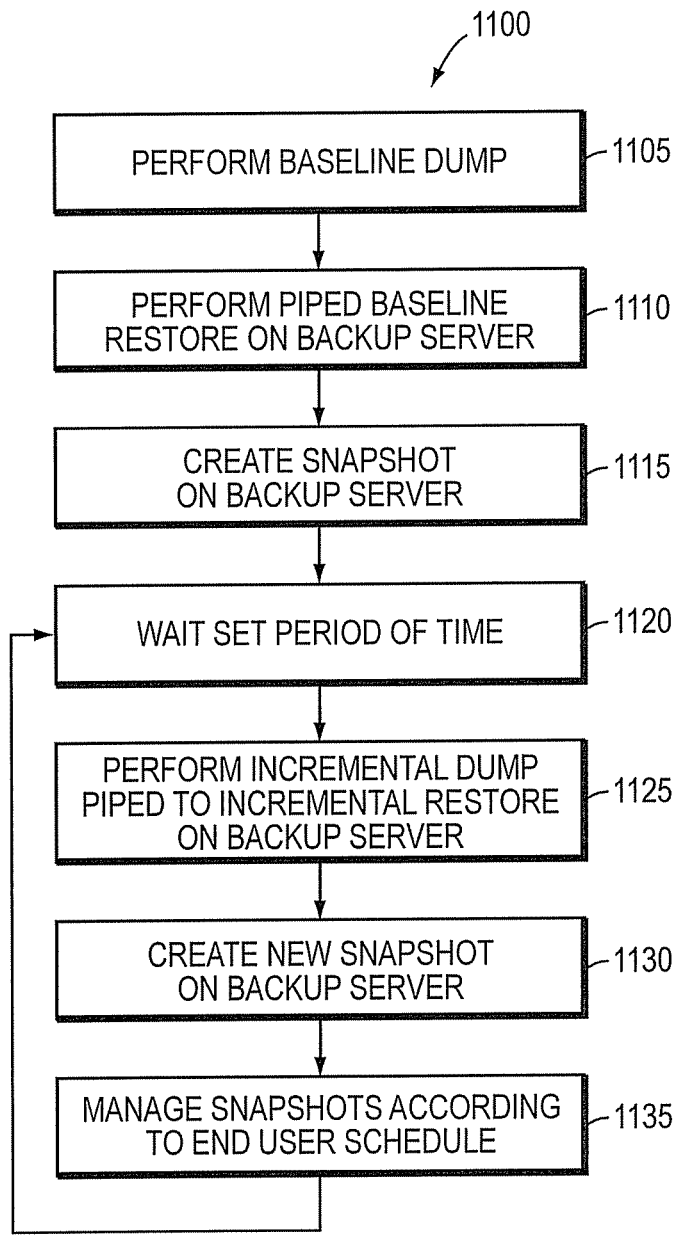
FIG. 11 is a flow chart detailing the procedure utilized by file servers in the illustrative environment of FIG. 10 in accordance with an embodiment of this invention.

An exemplary procedure performed by such a network environment is shown in FIG. 11. In step 1105, the file server whose file system is to be backed up performs a baseline dump (step 1105). This baseline dump can be generated using any acceptable backup and recovery or replication software and/or hardware. Next, in step 1110, a piped baseline restore is generated on the backup server. This piped baseline restore is generated using the dump data stream generated in the previous step. Once the baseline piped restore has been generated, the backup server creates a snapshot of the file system generated (step 1115). The backup server then waits a predetermined period of time (step 1120). Then, in step 1125, the file server or computer being whose file system is being backed up performs an incremental dump piped to an incremental restore to the backup server. Once this incremental restore has been generated on the backup server, the backup server creates a new snapshot in step 1130. The backup server then manages the set of snapshots according to the end user schedule in step 1135. This end user schedule can include a variety of user defined options. For example, a user may desire to store all snapshots generated in the last 24 hours but only one snapshot per day for the prior week.

The snapshot management software 332 (FIG. 3), using the user-defined management schedule, performs various operations on the set of snapshots generated. Exemplary operations could include, as noted above, deletion of snapshots which are generated prior to a specified date, deletion of snapshots of the file system which are in a transitioning state, or deletion of snapshots according to any other user-defined methodology. For example, the snapshot management software could be configured so that only the last snapshot generated in each day is retained. Thus, in this example, the snapshot manager would determine if a plurality of snapshots shared a timestamp evidencing that they were generated on the same day. If a plurality of snapshots were generated on the same day, the snapshot management software would delete all those which were not the last snapshot generated on that day.

F. Restore on Demand

The backup file system stored on the backup server is complete file system and is randomly accessible as the backup file system is stored on disks unlike serial-based devices such as tape devices. To improve restoration performance, individual files and directories can be restored on demand instead of waiting until the complete file system is restored.

Figure 12:
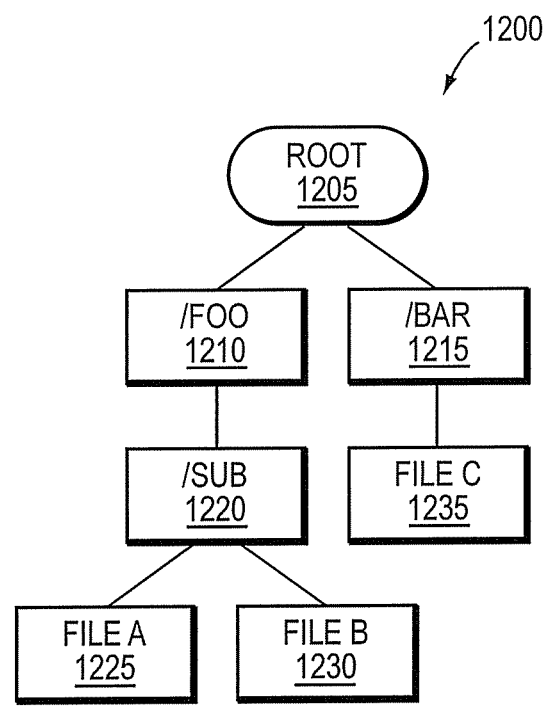
FIG. 12 is a schematic block diagram of an exemplary directory structure.

FIG. 12 is a block diagram of an exemplary directory structure 1200. The directory structure 1200 includes a root directory 1205 having two subdirectories foo 1210 and bar 1215. Under the foo directory 1210 is a subdirectory sub 1220. The sub sudirection 1220 includes files A and B 1225 and 1230. Similarly the bar directory 1215 includes file C 1235.

If a backup client of a backup server requires a restoration of a file system, for example the illustrative file system of FIG. 12, the various files and directories can be restored on demand to improve restoration performance. For example, assume that the file system of FIG. 12 was corrupted on the backup client. If the backup server contains a snapshot of the file system, a restoration can be generated from the snapshot. By only restoring on demand those files or directories that are needed, time and processing overhead can be saved. For example, assume that the file 1235 is required by the backup client.

Figure 13:
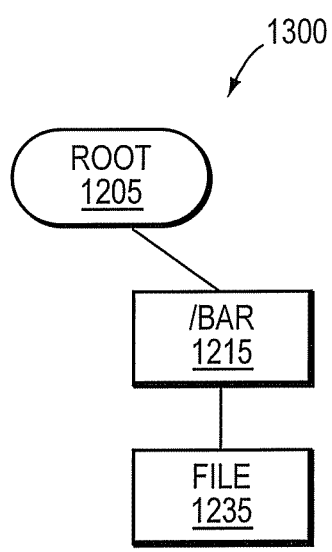
FIG. 13 is a schematic block diagram of a partially restored directory structure in accordance with an embodiment of the invention.
Figure 14:
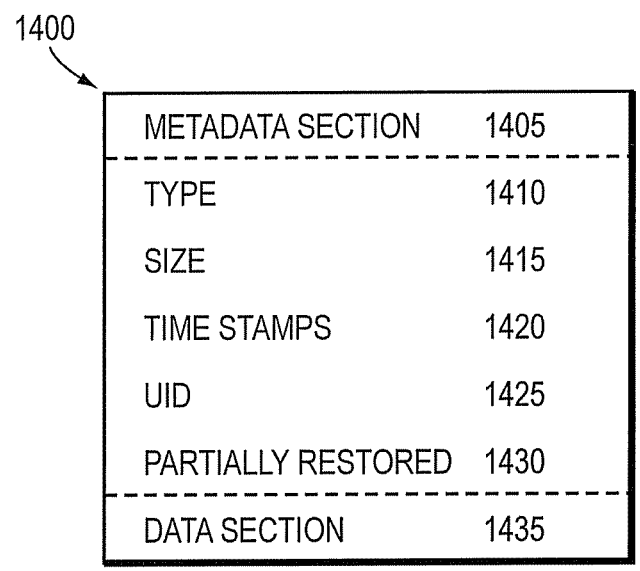
FIG. 14 is a schematic block diagram of an exemplary inode.

Under traditional snapshot restoration techniques, the entire file system 1200 would be restored. If, for example, the file system 1200 contained two terabytes (TB) of data, the entire 2 TB of data would need to be copied from the backup server snapshot to the active file system of the backup client. Such a data transfer could take a considerable amount of time. In order to alleviate such need for transferring mass quantities of data, only the file system structures needed to access a particular file are restored. Thus, when file 1235 is requested by the backup client, only the bar directory 1215 and the file 1235 need to be restored. Such a restoration is shown in FIG. 13. This restored file system structure 1300 includes the root directory 1205, the bar directory 1215 and the required file 1235. Thus, the foo directory 1210 and its associated subdirectories and files are not restored unless and until they are requested by the backup client. In an alternate embodiment, a full restoration can be performed using background processing while the restore on demand is being utilized.

Each inode of the restored file system has a flag that is set that alerts the file system layer of the storage operating system of the backup client that it is a partially restored inode. Thus, in response to such a flag, the file system layer can direct file access requests to the backup server to continue to restore on demand needed files.

An exemplary inode 1400 is shown in FIG. 3. The exemplary inode 1400 includes a metadata section 1405 and a data section 1435. The information stored the metadata section 1405 of each inode 1400 describes a file, and such, includes the type (e.g., regular or directory) 14010 of the file, the size 1415 of a file, time stamps (e.g. access and/or modification) 1420 for the file and ownership, i.e., user identifier (UID 1425) of the file. The metadata section 1405 also includes a flag identifying wherever the inode has been partially restored from a snapshot. The partially restored flag 1430 alerts the file system that the contents of the inode may not be completely restored from a snapshot and, to ensure that the proper data is obtained, the file system should access the backup server snapshot. The contents of the data section 1435 of the inode however, may be interpreted differently depending upon the type of file (inode) defined within the type field 1410. For example, the data section 1435 of a directory inode contains metadata controlled by the file system, whereas the data section of a regular inode contains user-defined data. In this latter case, the data section 1435 includes a representation of the data associated with the file.

Thus, by only restoring those files and directories as they are needed by the storage operating system, substantial processing time is saved. This time savings can be especially evident when the file system contains a substantial amount of data, but only a few smaller files are routinely needed. In such cases, the regularly accessed files can be restored as needed, while the larger and less frequently used files can be restored using a background process.

Accordingly, by keeping a metadata file within the active file system, data relating to the file system can be stored. By utilizing the file system's inherent snapshot capabilities, this metadata file will be incorporated into any snapshots of the file system. Thus, a file system becomes, in effect, a self-describing snapshot. The metadata can also be utilized by a snapshot management program running on a backup server. The backup server can accept conventional restore data streams from computers utilizing file systems which do not incorporate snapshot capabilities. Once a backup client of the backup server has restored the backup clients file system to the backup server, the backup server can take snapshots of the restored file system. This allows for the generation of snapshots of file systems which do not inherently contain the capability to generate a snapshot. In addition, this system and method advantageously enables a reliable, fast and low-overhead tapeless backup using a remote destination backup file server.

The foregoing has been a detailed description of illustrative embodiments of the invention. Various modifications and additions can be made without departing from the spirit and scope of the invention. It is expressly contemplated that any of the functions, procedures or processes described herein can be implemented using hardware, firmware or software, consisting of a computer-readable medium including program instructions executing on a computer, or a combination of hardware, firmware and/or software. Accordingly, this description is meant to be taken only by way of example and not to otherwise limit the scope of the invention.

What is claimed is:

1. A method for backing up a source file system, comprising:
   creating a metadata data structure associated with the source file system including data, the metadata data structure including a state entry field indicating whether the source file system is in a transitioning state or in a stable state;
   updating the state entry field of the metadata data structure associated with the source file system to indicate that the source file system is being modified and in the transitioning state;
   generating a first snapshot of the source file system while the source file system is in the transitioning state, wherein the first snapshot includes the data and the metadata data structure with the state entry field indicating that the source file system was in the transitioning state during generation of the first snapshot;
   storing the first snapshot of the source file system on one or more storage devices as a backup file system;
   updating the state entry field of the metadata data structure associated with the source file system to indicate that the source file system is in the stable state; and
   generating a second snapshot of the source file system, wherein the second snapshot includes the updated metadata data structure with the state entry field indicating that the source file system was in the stable state during generation of the second snapshot.

2. The method of claim 1, further comprising:
   periodically receiving an incremental dump stream of the source file system;
   using the incremental dump stream to perform an update of the backup file system, wherein the backup file system includes a baseline of the source file system;
   upon completing the update of the backup file system, updating the metadata data structure with the state entry field indicating that the backup file system is in the stable state; and
   creating a third snapshot of the source file system, the third snapshot including the updated metadata data structure.

3. The method of claim 1, wherein the state entry field of the metadata data structure comprises a binary flag.

4. The method of claim 1, wherein the first snapshot comprises a copy of a root inode of the source file system.

5. The method of claim 1, further comprising:
   restoring a requested file by restoring a root directory for the requested file, and then restoring directories associated with a path to the requested file, without restoring other files.

6. The method of claim 1, further comprising:
   receiving a dump stream of the source file system, the dump stream generated by a backup operation; and
   performing a restore operation of the dump stream.

7. The method as in claim 1, wherein the metadata data structure further comprises fields for a timestamp and an identifier of a computer associated with the source file system.

8. The method as in claim 1, further comprising:
   periodically snapshotting the source file system and storing each periodic snapshot on the one or more storage devices, and
   managing a plurality of periodic snapshots created by the periodical snapshotting, wherein managing includes deletion of a periodic snapshot of the plurality of periodic snapshots based on a time stamp included in the periodic snapshot.

9. A computer system apparatus, comprising:
   a processor configured to:
      create a metadata data structure including a flag indicating whether the source file system, including data, is in a transitioning state or in a stable state,
      update the flag of the metadata data structure to indicate that the source file system is being modified and in the transitioning state;
      generate a first snapshot of the source file system at a first time, while the source file system is in the transitioning state, such that the first snapshot includes the data of the source file system at the first time and the metadata data structure including the flag indicating that the source file system was in the transitioning state while the first snapshot was generated at the first time,
      store the first snapshot on one or more storage devices as a first backup file system;
   update the flag of the metadata data structure to indicate that the source file system is in the stable state; and
      generate a second snapshot of the source file system on the one or more storage devices as a second backup file system, wherein the second snapshot includes the updated metadata data structure with the flag indicating that the source file system was in the stable state during generation of the second snapshot.

10. The apparatus of claim 9, the processor further configured to:
    receive an incremental dump stream periodically,
    use the incremental dump stream to perform an incremental update of the backup file system, and
    create a third snapshot of the backup file system.

11. The apparatus of claim 9, further comprising:
    a magnetic tape drive configured to store the backup file system.

12. The apparatus of claim 9, wherein the first snapshot comprises a copy of a root inode of the source file system.

13. The apparatus of claim 9, wherein the processor is further configured to:
    restore a requested file from the first generated snapshot by restoring a root directory for the requested file and by restoring directories associated with a path to the requested file.

14. The apparatus of claim 13, wherein the processor is further configured to restore on demand a second file from the first snapshot, and wherein the second file includes an inode indicating the inode is partially restored.

15. The apparatus as in claim 9, wherein
    the processor is further configured to:
       periodically execute one or more additional snapshots of the source file system,
       store the additional snapshots, and manage the additional snapshots including deletion of one or more of the additional snapshots in response to the flag of the metadata structure included in the additional snapshot.

16. A non-transitory computer readable storage media stored with executable program instructions for execution by a processor, the computer readable storage media comprising:
- program instructions that update a metadata data structure including
  - a field utilized to indicate state information associated with data of a file system, the state information indicating if the file system is in a stable state or in a transitioning state,
- program instructions that update the state information of the metadata data structure to indicate that the data of the file system is being modified and the file system is in the transitioning state;
- program instructions that generate a first; snapshot of the data of the file system at a first time while the file system is in the transitioning state, the first snapshot including the data and metadata data structure including the field utilized to indicate that the file system is in the transitioning state when the first snapshot is being generated;
- program instructions that store the first snapshot on a storage device;
- program instructions that update the state information of the metadata data structure to indicate that the data of the file system is in the stable state; and
- program instructions that generate a second snapshot of the data of the file system, wherein the second snapshot includes the metadata data structure with the state information indicating that the file system was in the stable state during generation of the second snapshot.

* * * * *